(12) United States Patent
Lee et al.

(10) Patent No.: US 11,690,350 B2
(45) Date of Patent: Jul. 4, 2023

(54) METHODS, APPARATUS, AND SYSTEMS FOR MANAGING OBJECTS

(71) Applicant: COMAX LIVESTOCK TECHNOLOGY (JIANGSU) CO., LTD., Jiangsu (CN)

(72) Inventors: Gangpu Lee, Jiangsu (CN); Genping Xu, Jiangsu (CN); Zhen Luo, Jiangsu (CN); Shenjiang He, Jiangsu (CN); Weibo Zhang, Jiangsu (CN); Wenjun Ye, Jiangsu (CN)

(73) Assignee: COMAX LIVESTOCK TECHNOLOGY (JIANGSU) CO., LTD., Jiangsu (CN)

( * ) Notice: Subject to any disclaimer, the term of this patent is extended or adjusted under 35 U.S.C. 154(b) by 176 days.

(21) Appl. No.: 16/790,802

(22) Filed: Feb. 14, 2020

(65) Prior Publication Data

US 2020/0273056 A1 Aug. 27, 2020

(30) Foreign Application Priority Data

Feb. 26, 2019 (CN) .......................... 201910142215.X

(51) Int. Cl.
*A01K 1/00* (2006.01)
*G16Y 10/05* (2020.01)
*G01G 17/08* (2006.01)

(52) U.S. Cl.
CPC ........... *A01K 1/0023* (2013.01); *G01G 17/08* (2013.01); *G16Y 10/05* (2020.01)

(58) Field of Classification Search
CPC ....... A01K 1/0023; G01G 17/08; G16Y 10/05
See application file for complete search history.

(56) References Cited

U.S. PATENT DOCUMENTS

| 7,210,428 B2 * | 5/2007 | Thibault | ................ A01K 29/00 119/842 |
| 8,584,619 B2 * | 11/2013 | Eakin | ................... A01K 5/0266 119/515 |
| 10,194,633 B2 * | 2/2019 | Palmqvist | ............ A01K 11/006 |
| 2007/0193523 A1 | 8/2007 | Thibault | |

(Continued)

FOREIGN PATENT DOCUMENTS

| CN | 101658142 B | 2/2012 |
| CN | 103125402 B | 3/2015 |

(Continued)

*Primary Examiner* — Joshua D Huson
*Assistant Examiner* — Alanna K Peterson
(74) *Attorney, Agent, or Firm* — Morgan, Lewis & Bockius LLP

(57) ABSTRACT

A system for managing objects is provided. The system comprises a data collection gateway and a plurality of apparatus. Each of the plurality of apparatus obtains parameters relating to objects in a farm from a server through the data collection gateway. The parameters include a reference threshold weight of the objects. Each of the plurality of apparatus collects weights of the objects through sensors. Also, each of the plurality of apparatus adjusts the reference threshold weight based on the obtained parameters to generate an adjusted threshold weight. Further, each of the plurality of apparatus sorts the objects to different areas in the farm based on the adjusted threshold weight and the collected weights.

13 Claims, 15 Drawing Sheets

(56) References Cited

U.S. PATENT DOCUMENTS

2007/0204807 A1* 9/2007 Rausch ................. A01K 29/00
119/842
2007/0277748 A1* 12/2007 Thibault .............. A01K 1/0017
119/712

FOREIGN PATENT DOCUMENTS

| | | | | |
|---|---|---|---|---|
| CN | 105903681 A | * | 8/2016 | |
| CN | 206043047 U | | 3/2017 | |
| CN | 206776432 U | | 12/2017 | |
| CN | 105903681 B | | 9/2018 | |
| EP | 1 985 174 B1 | | 8/2009 | |
| FR | 2983034 A1 | * | 5/2013 | ........... A01K 1/0023 |
| WO | WO-2006133717 A2 | * | 12/2006 | ........... A01K 1/0023 |

* cited by examiner

METHODS, APPARATUS, AND SYSTEMS FOR MANAGING OBJECTS

CROSS-REFERENCE TO RELATED APPLICATION

This application claims priority to Chinese Patent Application No. 201910142215.X, filed on Feb. 26, 2019, which is incorporated herein in its entirety by reference.

TECHNICAL FIELD

The present disclosure relates generally to managing objects such as livestock, and more particularly, to methods, apparatus, and systems for growing and sorting objects.

BACKGROUND

Quality of livestock may affect the market price of the livestock. In order to reduce costs and increase profits, farms need to produce livestock with high quality such as livestock with moderate weights and lower fat. One solution is to feed the livestock in separate groups. With this solution, farms can select livestock to meet specific market requirements such as select livestock within a specific range of weights or feeding requirements such as feeding livestock by phases of growing condition of the livestock. However, it may be difficult and expensive to manually determine a basis such as a threshold weight of the livestock for sorting the livestock to meet the specific market requirements or feeding requirements. In addition, due to a lack of data relating to livestock from other farms and external factors such as market price or market requirements, it may be difficult to comprehensively consider various factors to determine the basis. Moreover, it may be difficult to efficiently sort the livestock in separate groups or collect precise data relating to the livestock without repeatedly training the livestock.

Thus, it would be desirable to develop apparatus, systems, and methods that take into account at least some of the issues discussed above, as well as other possible issues.

SUMMARY

Exemplary implementations of the present disclosure are directed to managing objects such as livestock. Exemplary implementations use a system, such as a growth and marketing sorting system, comprising a plurality of apparatus to collect data relating to objects through sensors and sort the objects to different areas in a farm. Exemplary implementations can obtain parameters relating to objects such data from outside of a farm via a server. Exemplary implementations can adjust the basis for sorting livestock in separate groups based on the parameters obtained from the server and/or data collected through sensors. Exemplary implementations can upload the adjusted basis and data collected through sensors to the server from the plurality of apparatus. In some embodiments, the exemplary implementations can be realized in a distributed system such as a blockchain system.

Exemplary implementations can provide multiple advantages over existing solutions. For example, by obtaining parameters relating to objects such as data from outside of the farm via a server and/or collecting data relating to objects through sensors, the plurality of apparatus can comprehensively consider various factors including marketing factors to determine the basis for sorting livestock in separate groups and can select objects with higher quality to increase the profits of the farm. Also, the system deployed in a farm can collect precise data relating to the objects through sensors without repeatedly training the objects, facilitate sorting objects such as livestock in separate groups, and predict timing for selling objects on the market. Thus, it can save labor cost of the farm. Moreover, by adjusting the basis, the plurality of apparatus can select specific ranges of objects for specific market requirements or feeding requirements such as feeding livestock by phases of growing condition of the livestock. Furthermore, by uploading the adjusted basis and data collected through sensors to the server, the system can share the adjusted basis and the collected data to others such as other farms, meat packers, or their customers.

The present disclosure thus includes, without limitation, the following exemplary implementations.

Some exemplary implementations provide a system for a farm, comprising: a data collection gateway; and a plurality of apparatus, each of which is configured to: obtain parameters relating to objects in the farm from a server through the data collection gateway, the parameters including a reference threshold weight of the objects; collect weights of the objects through sensors; adjust the reference threshold weight based on the obtained parameters to generate an adjusted threshold weight; and sort the objects to different areas in the farm based on the adjusted threshold weight and the collected weights.

In some exemplary implementations or any combination of preceding exemplary implementations of the system, the reference threshold weight has different values for at least some of the plurality of apparatus, and the adjusted threshold weight has different values for at least some of the plurality of apparatus.

In some exemplary implementations or any combination of preceding exemplary implementations of the system, one or more of the plurality of apparatus are further configured to upload the adjusted threshold weights of the one or more of the plurality of apparatus to the server through the data collection gateway for storing the adjusted threshold weights in a database.

In some exemplary implementations or any combination of preceding exemplary implementations of the system, at least one of the plurality of apparatus is configured to adjust the reference threshold weight based on an adjusted threshold weight of at least another apparatus of the plurality of apparatus.

In some exemplary implementations or any combination of preceding exemplary implementations of the system, each of the plurality of apparatus is connected to the data collection gateway via a data bus.

In some exemplary implementations or any combination of preceding exemplary implementations of the system, the parameters relating to the objects include at least: a number of the objects; a range of market weights; a market price of the objects; and weights of other objects from at least another farm.

In some exemplary implementations or any combination of preceding exemplary implementations of the system, the objects include livestock.

Some exemplary implementations provide an apparatus, comprising: an entry gate; a sorting scale coupled to the entry gate; an exit gate coupled to the sorting scale; a sorting gate; a plurality of gates coupled to the sorting gate; and a processor and a memory storing executable instructions that, in response to execution by the processor, cause the apparatus to: open the entry gate to enable an object to enter the sorting scale through the entry gate; obtain a weight of the object using the sorting scale; move the sorting gate based on the weight of the object to form a passageway between the exit gate and one of the plurality of gates; and thereafter, open the exit gate to enable the object to pass through the passageway and reach the one of the plurality of gates.

In some exemplary implementations or any combination of preceding exemplary implementations of the apparatus, the apparatus being caused to move the sorting gate based on the weight of the object includes being caused to: determine a threshold weight based on parameters relating to a plurality of objects obtained from a server; perform a comparison between the weight of the object and the threshold weight; and move the sorting gate based on the comparison to form the passageway.

In some exemplary implementations or any combination of preceding exemplary implementations of the apparatus, the memory stores further executable instructions that, in response to execution by the processor, cause the apparatus to further: obtain weights of the plurality of objects using the sorting scale; and upload the weights to the server for storing the weights in a database.

In some exemplary implementations or any combination of preceding exemplary implementations of the apparatus, the memory stores further executable instructions that, in response to execution by the processor, cause the apparatus to further: close the entry gate for a number of times; and upon determining that the number of times has a threshold value, generate a warning signal indicating that the entry gate is not closed.

In some exemplary implementations or any combination of preceding exemplary implementations of the apparatus, the memory stores further executable instructions that, in response to execution by the processor, cause the apparatus to further: determine that the object is within the sorting scale for a predetermined period of time; and in response, utilize a mechanism or generate a signal to stimulate the object to pass through the exit gate.

In some exemplary implementations or any combination of preceding exemplary implementations of the apparatus, the memory stores further executable instructions that, in response to execution by the processor, cause the apparatus to further: determine that the object is within the sorting scale for a predetermined period of time; and in response, open the entry gate while the exit gate is open to facilitate the object to pass through the exit gate by enabling another object to enter the sorting scale through the entry gate.

In some exemplary implementations or any combination of preceding exemplary implementations of the apparatus, the memory stores further executable instructions that, in response to execution by the processor, cause the apparatus to further: swing the sorting gate to facilitate the object to pass through the passageway and reach the one of the plurality of gates.

Some exemplary implementations provide a method implemented by an apparatus. The apparatus comprises an entry gate, a sorting scale, an exit gate, a sorting gate, and a plurality of gates, and the method comprises: opening the entry gate to enable an object to enter the sorting scale through the entry gate; obtaining a weight of the object using the sorting scale; moving the sorting gate based on the weight of the object to form a passageway between the exit gate and one of the plurality of gates; and thereafter, opening the exit gate to enable the object to pass through the passageway and reach the one of the plurality of gates.

These and other features, aspects, and advantages of the present disclosure will be apparent from a reading of the following detailed description together with the accompanying figures, which are briefly described below. The present disclosure includes any combination of two or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and exemplary implementations, should be viewed as combinable unless the context of the disclosure clearly dictates otherwise.

It will therefore be appreciated that this Brief Summary is provided merely for purposes of summarizing some exemplary implementations so as to provide a basic understanding of some aspects of the disclosure. Accordingly, it will be appreciated that the above described exemplary implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described exemplary implementations.

BRIEF DESCRIPTION OF THE DRAWINGS

Figure 1:
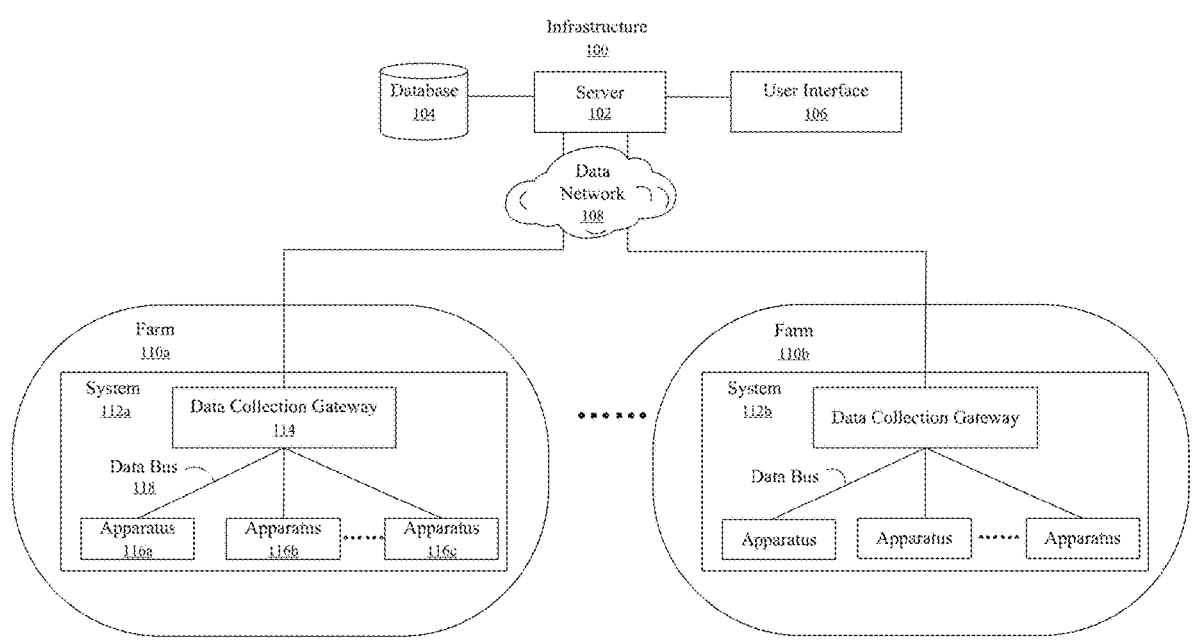
Figure 2:
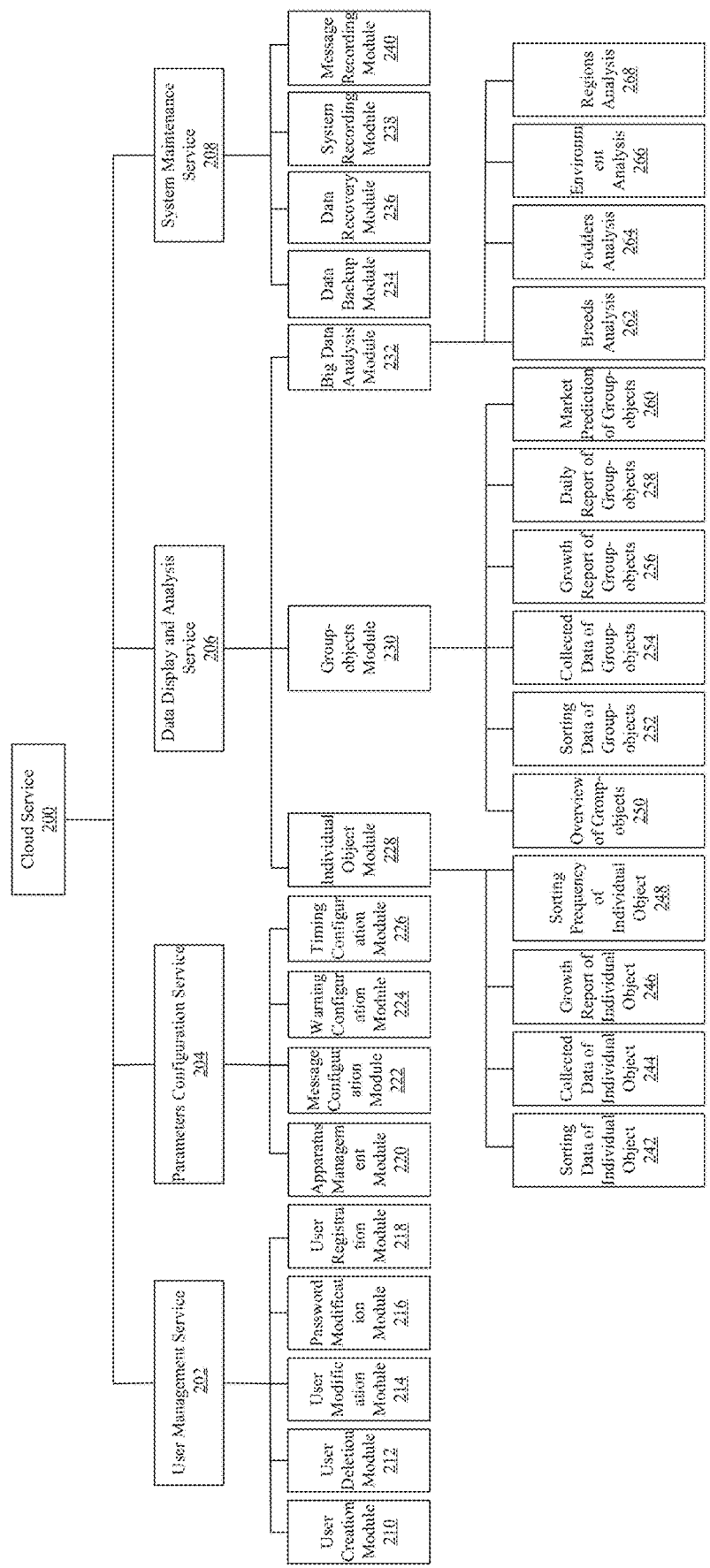
Figure 3:
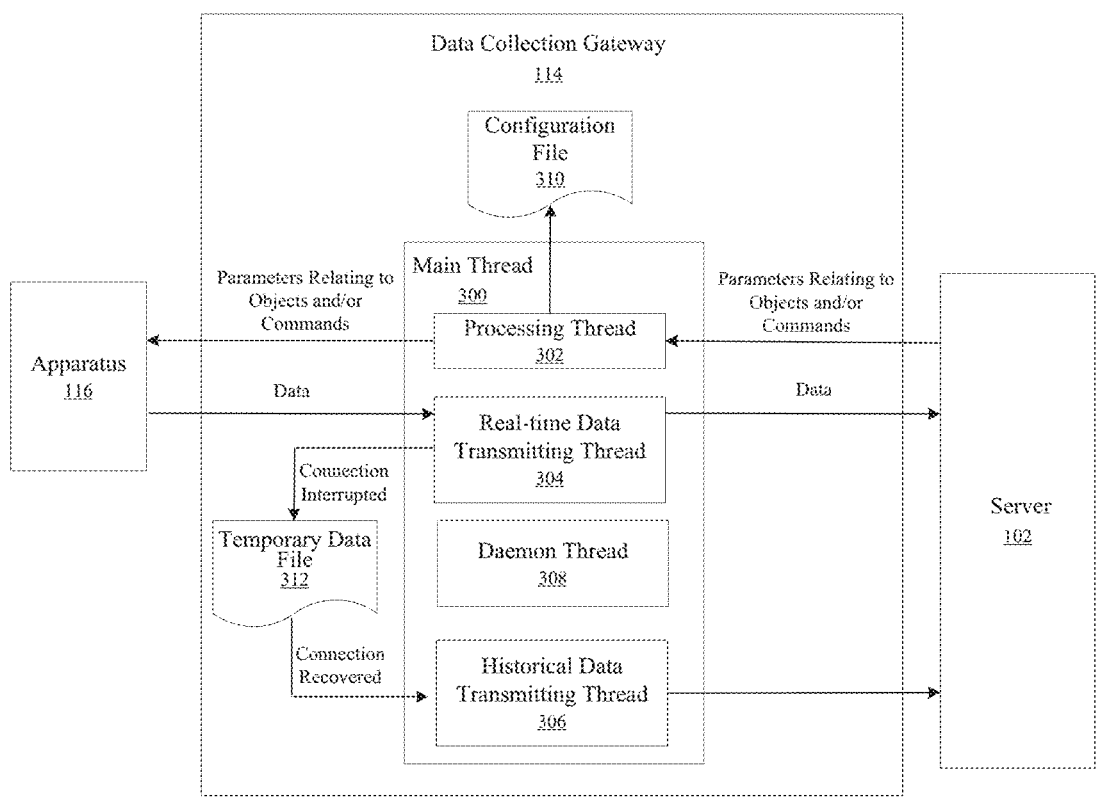
Figure 4A:
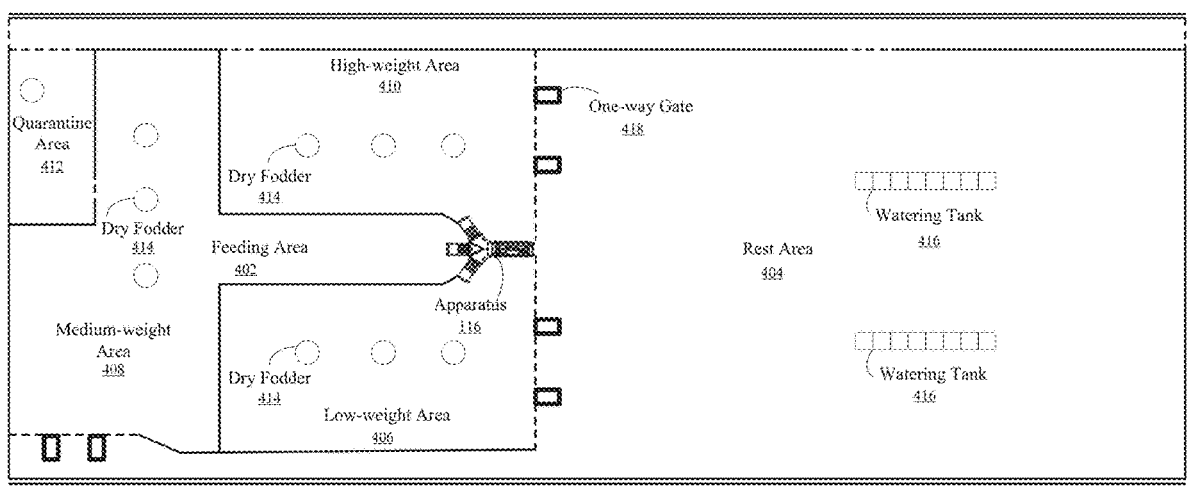
Figure 4B:
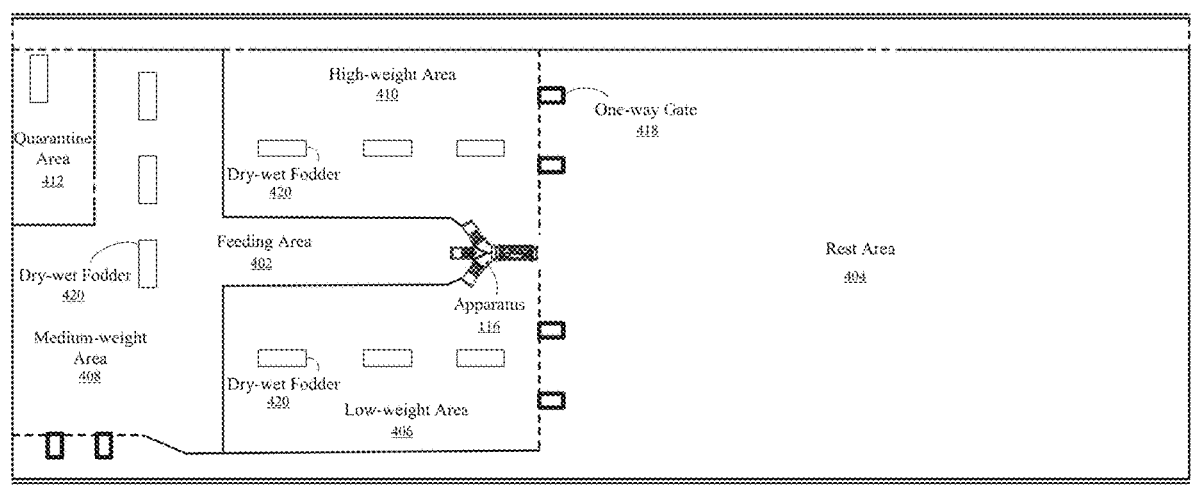
Figure 5A:
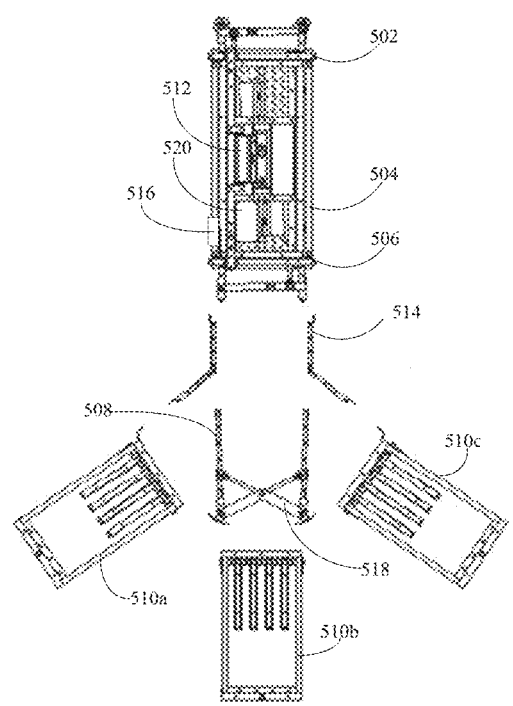
Figure 5B:
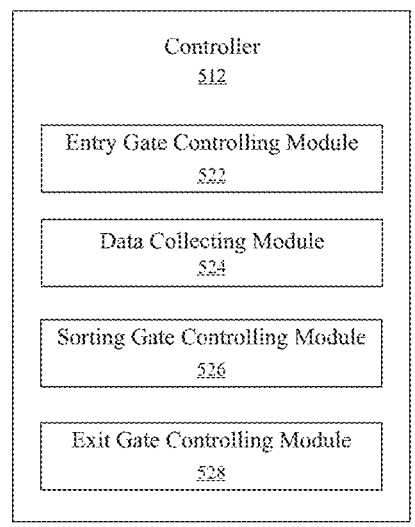
Figure 5C:
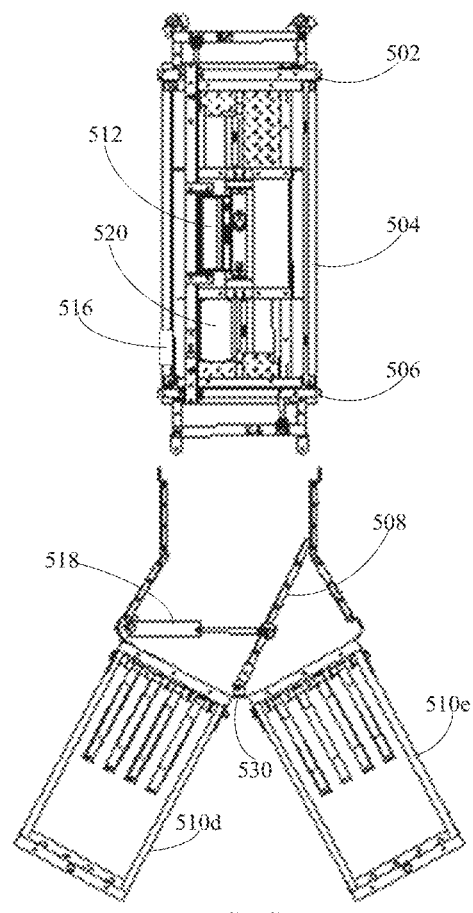
Figure 5D:
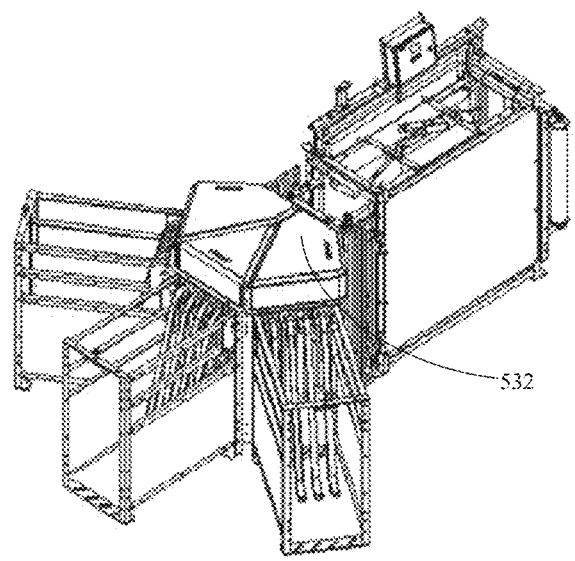
Figure 5E:
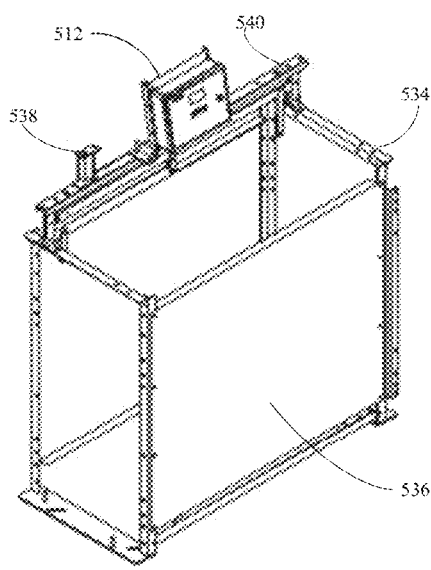
Figure 5F:
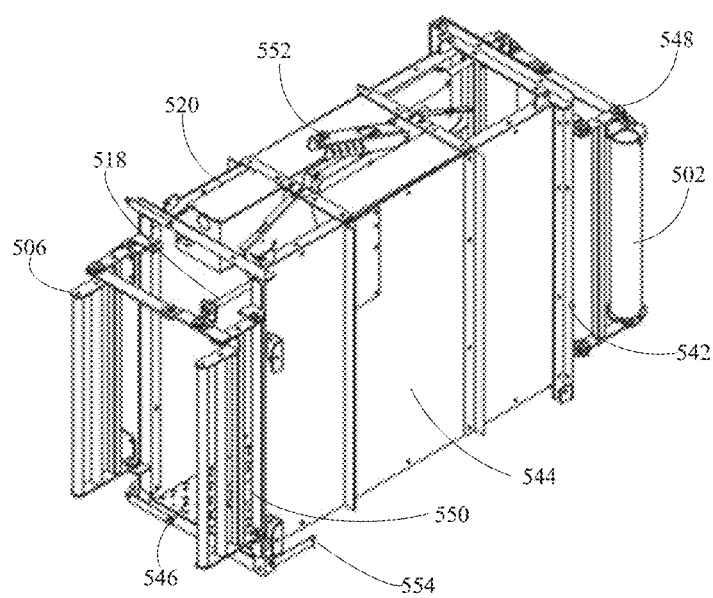
Figure 6:
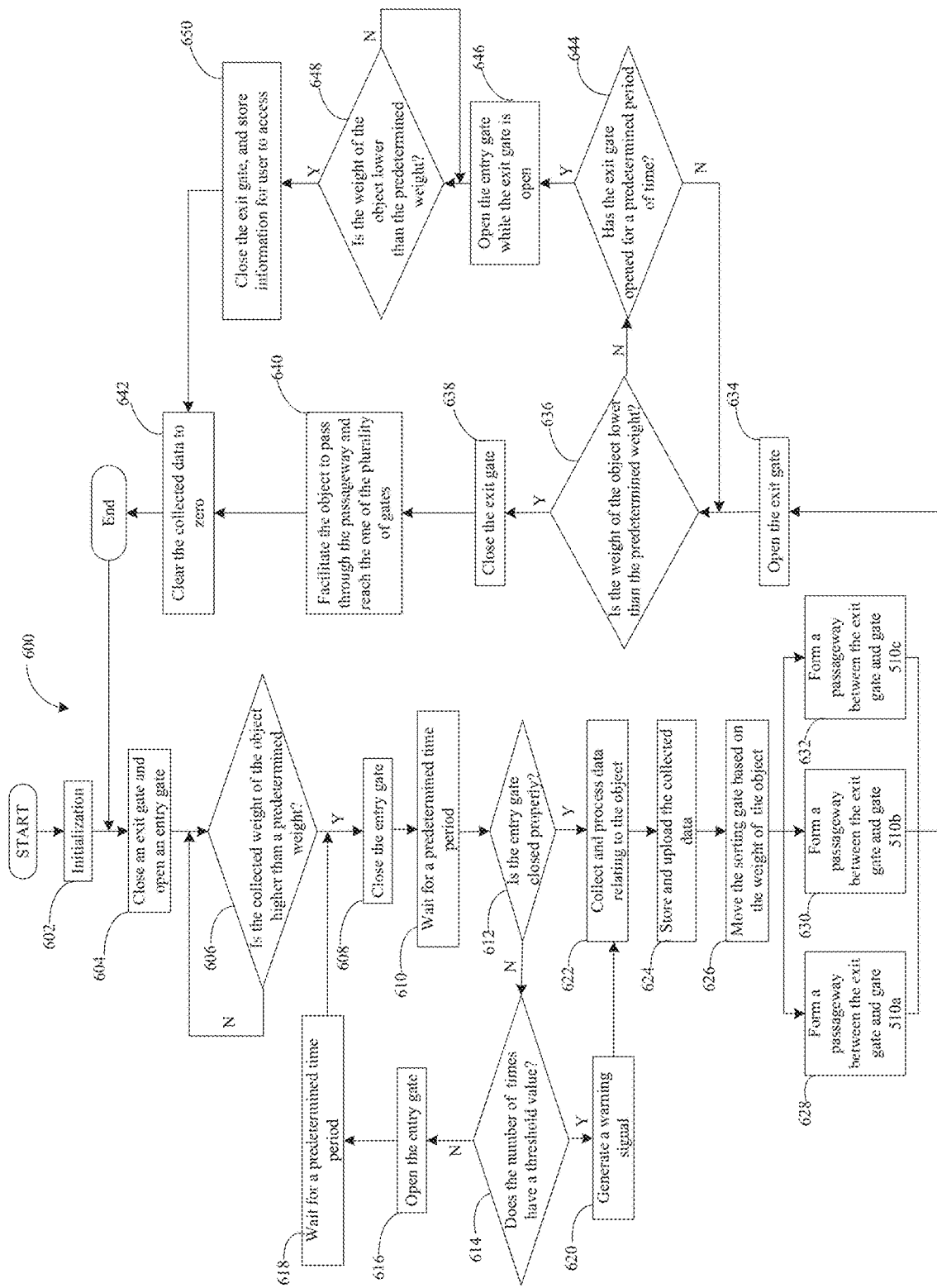
Figure 7:
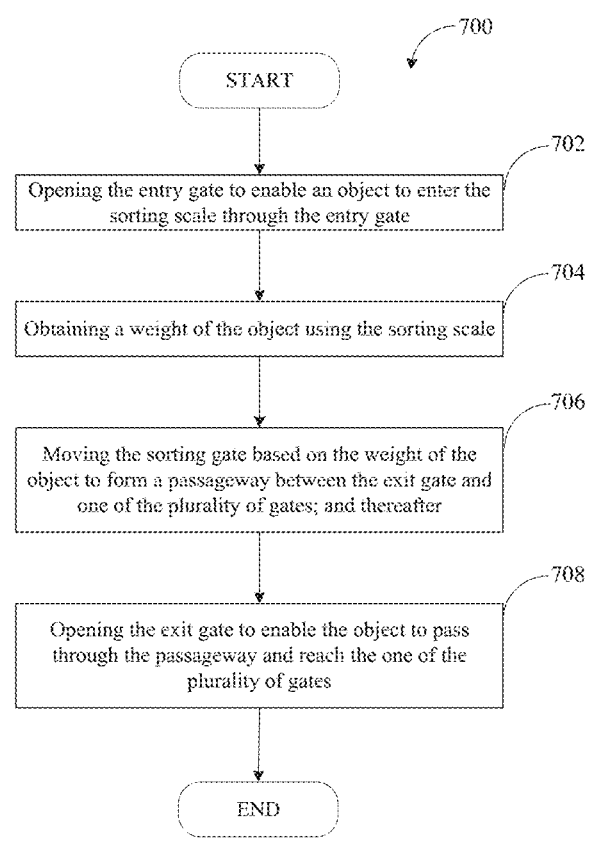
Figure 8:
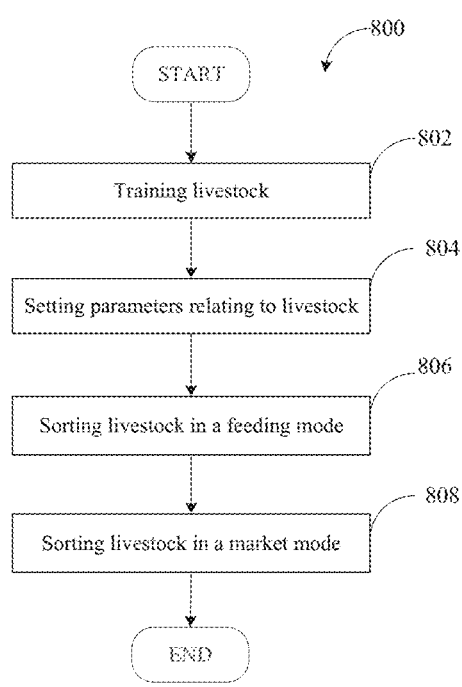
Figure 9:
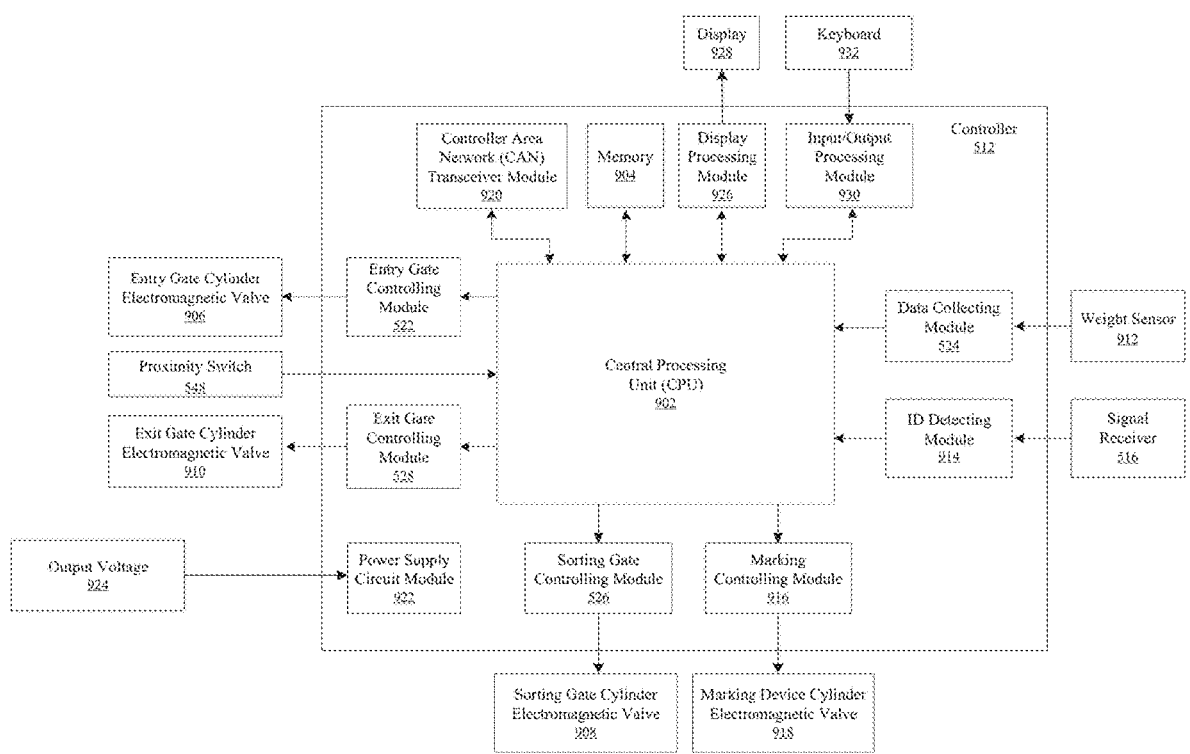

Having thus described exemplary implementations of the disclosure in general terms, reference will now be made to the accompanying figures, which are not necessarily drawn to scale, and wherein:

FIG. 1 illustrates an infrastructure for managing objects, according to exemplary implementations of the present disclosure;

FIG. 2 illustrates a block diagram of exemplary modules for managing objects, according to exemplary implementations of the present disclosure;

FIG. 3 illustrates a block diagram of an exemplary data collection gateway, according to exemplary implementations of the present disclosure;

FIGS. 4A-4B each illustrates a block diagram of an exemplary farm, according to exemplary implementations of the present disclosure;

FIGS. 5A-5B each illustrates an exemplary apparatus and/or its components, according to exemplary implementations of the present disclosure;

FIGS. 5C, 5D, 5E, and 5F each illustrates an exemplary apparatus and/or its components, according to other exemplary implementations of the present disclosure FIG. 6 illustrates a flowchart illustrating various operations in an exemplary method of sorting objects, according to exemplary implementations of the present disclosure;

FIG. 7 illustrates a flowchart illustrating various operations in an exemplary method of sorting objects, according to other exemplary implementations of the present disclosure;

FIG. 8 illustrates a flowchart illustrating various operations in an exemplary method of managing livestock, according to exemplary implementations of the present disclosure; and FIG. 9 illustrates hardware components of an exemplary controller, according to exemplary implementations of the present disclosure.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these exemplary implementations are provided so that this disclosure will be thorough and complete, and will fully convey the scope of the disclosure to those skilled in the art. For example, unless otherwise indicated, reference to something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Exemplary implementations of the present disclosure are generally directed to managing objects such as livestock, and in particular, to methods, apparatus, and systems for managing objects such as feeding or sorting objects. It should be understood that the methods, apparatus, and systems are applicable to any of a number of objects such as pigs, cattle, sheep, goats, horses, mules, asses, buffalo, and camels or the like.

FIG. 1 illustrates an exemplary infrastructure 100 for managing objects, according to exemplary implementations of the present disclosure. As shown, in some embodiments, the infrastructure 100 may include a server 102 connected to a database 104. Server 102 may store or retrieve information from database 104. In one embodiment, server 102 and/or database 104 may be in a cloud. The infrastructure 100 may also include a user interface 106 such as a browser or an application ("App") to allow a user to provide inputs such as parameters relating to objects to server 102. The infrastructure 100 may further include one or more systems 112, e.g., systems 112a and 112b. The systems 112 may be connected to server 102 via a data network 108. Each system 112 may be deployed for a respective farm 110 to facilitate sorting objects such as livestock in the farm 110. For example, system 112a may be deployed for the farm 110a to facilitate sorting livestock in the farm 110a, and system 112b may be deployed for the farm 110b to facilitate sorting livestock in the farm 110b. It should also be understood that the infrastructure 100 may include one or more additional or alternative subsystems than those shown in FIG. 1.

As shown in FIG. 1, in some embodiments, each system 112 (e.g., system 112a) includes a plurality of apparatus 116 (e.g., apparatus 116a, 116b and 116c) and a data collection gateway 114. In these examples, each of the plurality of apparatus 116 is connected to the data collection gateway 114 via a data bus 118. The data bus 118 may be a Controller Area Network (CAN) data bus or RS485 data bus. In other embodiments, the system 112 may include only one apparatus 116 connected to the data collection gateway 114 via the data bus 118.

In some embodiments, for a system 112 (e.g., system 112a), each of the plurality of apparatus 116 (e.g., apparatus 116a, 116b and 116c) is configured to obtain parameters relating to objects in a farm (e.g., farm 110a) from server 102 through the data collection gateway 114. In these examples, the parameters include a reference threshold weight of the objects. The reference threshold weight may be used to facilitate sorting the objects in the farm, as described with greater details below.

In some embodiments, the reference threshold weight may have a same value for the plurality of apparatus 116 in a farm 110. In other embodiments, some of the apparatus 116 in the farm 110 may need different values of the reference threshold weight for sorting the objects to meet different market requirements (e.g., selecting particular range of market weights) or feeding requirements (e.g., feeding objects by group according to different growing phases of the objects). In these examples, the reference threshold weight may have different values for at least some of the plurality of apparatus 116 in the farm 110. For example, the reference threshold weight for apparatus 116a may be different from the reference threshold weight for apparatus 116b in the farm 110a.

In some embodiments, for a system (e.g., system 112a), the parameters relating to the objects may include at least a number of the objects (e.g., the number of the objects may be 500), a range of market weights, a market price of the objects, and weights of other objects from at least another farm. The parameters may also include other information, as described with greater details below.

The system 112 may collect data relating to objects through sensors and upload the collected data to server 102. The sensors may be installed or attached to the apparatus 116. Data collected by the apparatus 116 can be uploaded to server 102 through the data collection gateway 114 via the data bus 118. To ensure the accuracy of the collected data, an Internet of Things (IoT) based on the data bus 118 such as CAN data bus or RS485 data bus can be formed between the data collection gateway 114 and the apparatus 116 or among some of the apparatus 116. Server 102 can store the collected data in database 104. In some embodiments, the apparatus 116 can also store the collected data. In some embodiments, for a system (e.g., system 112a), each of the plurality of apparatus 116 is configured to collect weights of the objects through sensors. Each of the plurality of apparatus 116 may upload the collected weights to server 102 for storing the collected weights in database 104.

As described above, server 102 may provide parameters relating to objects, including the reference threshold weight, to each of the apparatus 116 of a system 112 in a farm 110. In these examples, for a system (e.g., system 112a), each of the apparatus 116 is configured to adjust the reference threshold weight based on the obtained parameters to generate an adjusted threshold weight. For example, each of the apparatus 116 may adjust the reference threshold weight based on the obtained median weight or average weight of objects on the same day to generate an adjusted threshold weight. It should be understood that different adjusted threshold weights can be used to sort different quality of objects. When a specific apparatus can sort a higher quality of objects than other apparatus based on an adjusted threshold weight of the specific apparatus, other apparatus in the farm or apparatus in other farms may further adjust their reference threshold weights based on the adjusted threshold weight of the specific apparatus.

In some embodiments, for a system (e.g., system 112a), at least one of the plurality of apparatus 116 is configured to adjust the reference threshold weight based on an adjusted threshold weight of at least another apparatus of the plurality of apparatus 116 in the same farm (e.g., farm 110a). For example, apparatus 116a and apparatus 116b may adjust the reference threshold weight based on an adjusted threshold weight of apparatus 116c in the same farm 110a. In other embodiments, at least one of the plurality of apparatus 116 in a farm (e.g., farm 110a) may adjust the reference threshold weight based on an adjusted threshold weight of apparatus in other farms (e.g., farm 110b). For example, apparatus 116a and apparatus 116b in a farm 110a may adjust the reference threshold weight based on an adjusted threshold weight of apparatus in a farm 110b. In some embodiments, one or more of the plurality of apparatus 116 are further configured to upload the adjusted threshold weights to server 102 through the data collection gateway 114. In these examples, the adjusted threshold weights can be stored in database 104.

In some embodiments, server 102 may obtain parameters relating to objects from database 104. The parameters relating to objects may include the reference threshold weight. In other embodiments, the parameters relating to objects may not include the reference threshold weight, server 102 may generate the reference threshold weight based on the information retrieved from database 104. In some embodiments, server 102 may dynamically update the reference threshold weight. In some embodiments, server 102 may dynamically provide the updated reference threshold weight to database 104, apparatus 116, and/or the users, respectively. In some embodiments, server 102 can be connected to the one or more data collection gateways 114. The reference threshold weight and the updated reference threshold weight can be transmitted to apparatus 116 via the one or more data collection gateways 114.

The system 112 may sort the objects to different areas in the farm 110 based on the adjusted threshold weight and/or data relating to the objects collected through sensors in the farm 110. In some embodiments, for a system (e.g., system 112a), each of the apparatus 116 is configured to sort the objects to different areas in the farm 110a based on the adjusted threshold weight and the collected weights. The adjusted threshold weight may have a same value for the plurality of apparatus 116 in the farm 110. In other embodiments, some apparatus in a farm need different values of the adjusted reference threshold weight for sorting objects to meet different market requirements or feeding requirements. In these examples, the adjusted threshold weight may have different values for at least some of the plurality of apparatus 116. In addition, it should be noted that the adjusted threshold weight in different farms 110 may have same or different value(s) for the apparatus 116.

As describe above, in some embodiments, the objects include livestock. For example, the livestock may include pigs, cattle, sheep, goats, horses, mules, asses, buffalo, and camels or the like.

The system 112 may include any of a number of different subsystems (each an individual system) for performing one or more functions or operations. The subsystems may be co-located or directly coupled to one another, or in some embodiments, various ones of the subsystems may communicate with one another across one or more computer networks. Further, although shown as part of the system 112, it should be understood that any one or more of the apparatus 116 and the data collection gateway 114 may function or operate as a separate system without regard to any of the other subsystems. It should also be understood that the system 112 may include one or more additional or alternative subsystems than those shown in FIG. 1.

Although the above description primarily refers to system 112a, similar functions and processes can be applied to other systems such as system 112b in the infrastructure 100.

In some embodiments, in the infrastructure 100, database 104 may include a blockchain database. Using a blockchain technology, a plurality of farms are able to access same data, such as the data stored in the blockchain database. Due to the nature of the blockchain technology, data on the blockchain are almost impossible to be forged and/or falsified, which may increase data integrity and safety. The data stored in the blockchain database may include parameters relating to objects, such as the reference threshold weight of objects, the adjusted reference threshold weight of the objects, and data collected from sensors or the like.

In some embodiments, apparatus 116 may form a blockchain to share information such as parameters within each other. In these embodiments, apparatus 116 may not need to retrieve parameters stored in database 104 via server 102. Instead, one apparatus 116 may receive the parameters from other apparatus 116 using blockchain technology. For example, one apparatus 116 (e.g., apparatus 116a) may request parameters ("token") such as a reference threshold weight from other apparatus 116 to adjust its own threshold weight. In this example, the requesting apparatus 116 may generate a unique address using private and public keys and broadcast the unique address to other apparatus 116. After receiving the unique address of apparatus 116a, other apparatus 116 (e.g., apparatus 116b) may send the requested parameters to the unique address such that the requesting apparatus 116a can receive the requested parameters.

In some embodiments, WiFi or cellular networks (e.g., 2G, 3G, 4G, 5G or the like) may not be available for apparatuses 116 to communicate with each other to exchange information. In these embodiments, apparatuses 116 may communicate with each other through satellite communication. Alternatively, apparatuses 116 may form a local IoT network to communicate with each other without accessing to external network such as Internet.

FIG. 2 illustrates a block diagram of exemplary modules for managing objects, according to example implementations of the present disclosure. As shown, in some embodiments, the infrastructure 100 may provide a Cloud Service 200 for users, including a User Management Service 202, a Parameters Configuration Service 204, a Data Display and Analysis Service 206, and a System Maintenance Service 208.

The User Management Service 202 may include one or more modules for managing information relating to users of the Cloud Service 200. As shown in FIG. 2, in some embodiments, the User Management Service 202 may include a User Creation Module 210, a User Deletion Module 212, a User Modification Module 214, a Password Modification Module 216, and a User Registration Module 218.

The User Creation Module 210 can create accounts of different user groups to access the Cloud Service 200. In some embodiments, the user groups may include a super administrator group, an administrator group, and an operator group. Users in the super administrator group may access, modify and/or delete all information (e.g., information relating to user groups) stored in database 104. Users in the administrator group may access, modify and/or delete limited information (e.g., information relating to the operator group) stored in database 104. Users in the operator group may have no permission to access, modify and/or delete information relating to the super administrator group and the administrator group stored in database 104.

The User Deletion Module 212 can delete information relating to the accounts, such as user name. The User Modification Module 214 can modify information relating to the accounts, such as user name. In some embodiments, users in the super administrator group may access, modify and/or delete the accounts of the administrator group and the accounts of the operator group. In other embodiments, users in the administrator group may access, modify and/or delete the accounts of the operator group. In further examples, users in the operator group may modify its own user information. The Password Modification Module 216 can modify passwords of the accounts. The User Registration Module 218 can manage registration of users. In some embodiments, the User Registration Module 218 can create a registration code. The registration code may be a unique code effective for a given period of time.

The Parameters Configuration Service 204 may include one or more modules for configuring parameters. As shown in FIG. 2, in some embodiments, the Parameters Configuration Service 204 may include an Apparatus Management Module 220, a Message Configuration Module 222, a Warning Configuration Module 224, and a Timing Configuration Module 226.

The Apparatus Management Module 220 can set parameters relating to objects for apparatus 116. In some embodiments, the parameters relating to objects may include an operation parameters such as a predetermined weight, a predetermined period of time, a calibration value for a sorting scale, a time interval for re-opening the entry gate, and a duration for opening a sorting gate or the like. For example, the predetermined weight can be an indication that an object enters into or leaves a sorting gate. The predetermined period of time can be an indication of a duration that an object has stayed within the sorting gate.

In some embodiments, the parameters relating to objects may include a reference parameter such as a reference threshold weight, a range of market weights, a number of the market objects, and a market price of the objects, a range of weights of objects, a objects for sorting, or the like. For example, the reference threshold weight can be used as a basis for sorting the objects based on weights of the objects.

In some embodiments, the parameters relating to objects may include a statistic parameter such as a statistical percentage of the objects, a number of the objects in a farm, a number of other objects from at least another farm, weights of the objects in a farm, weights of other objects from at least another farm, a percentile of weights of the objects in a farm, and a percentile of weights of other objects from at least another farm or the like. In some embodiments, the parameters relating to objects may include a combination of the operation parameter, reference parameter, and/or statistic parameter.

The Message Configuration Module 222 can set contact information of users, such as telephone number of users. The Warning Configuration Module 224 can set forms (e.g., text message or dialog window) or contents of a warning signal. The Timing Configuration Module 226 can set a timing for the infrastructure 100. For example, the timing can be a period of time for automatically backing up data stored in the infrastructure 100. In another example, the timing can be a period of time for calibrating the apparatus 116, the data collection gateway 114, and/or server 102.

The Data Display and Analysis Service 206 may include one or more modules for displaying and analyzing data relating to objects. As shown in FIG. 2, in some embodiments, the Data Display and Analysis Service 206 may include an Individual Object Module 228, a Group-objects Module 230, and a Big Data Analysis Module 232. As shown, in some embodiments, the Individual Object Module 228 may include Sorting Data of Individual Object 242, Collected Data of Individual Object 244, a Growth Report of Individual Object 246, and a Sorting Frequency of Individual Object 248. For example, the Sorting Data of Individual Object 242 may include different areas that an individual object may be sorted to. The Collected Data of Individual Object 244 may include data such as weights of an individual object collected by the apparatus 116. The Growth Report of Individual Object 246 may include a growth report of weights of an individual object. The Sorting Frequency of Individual Object 248 may include a frequency of sorting an individual object within a period of time.

As shown in FIG. 2, in some embodiments, the Group-objects Module 230 may include an Overview of Group-objects 250, Sorting Data of Group-objects 252, Collected Data of Group-objects 254, a Growth Report of Group-objects 256, a Daily Report of Group-objects 258, and a Market Prediction of Group-objects 260. For example, the Overview of Group-objects 250 may include sorting data, collected data, a growth report, or a daily report of objects for apparatus (e.g., apparatus 116) in a farm (e.g., farm 110a). The Sorting Data of Group-objects 252 may include sorting data of objects for an apparatus, such as an average weight, a sorting frequency, or a remaining number of objects for the apparatus. The Collected Data of Group-objects 254 may include data such as weights of objects collected by an apparatus. The Growth Report of Group-objects 256 may include a growth report of weights of objects for an apparatus. The Daily Report of Group-objects 258 may include a daily report of sorting data and collected data of objects for an apparatus.

The Market Prediction of Group-objects 260 may include a prediction of objects to be sold on the market, such as a range of market weights to be sold on the market, a market price of objects to be sold on the market, or a time interval of sorting objects to be sold on the market.

As shown in FIG. 2, in some embodiments, the Big Data Analysis Module 232 may include a Breeds Analysis 262, a Fodders Analysis 264, an Environment Analysis 266, and a Regions Analysis 268. In these examples, the Big Data Analysis Module 232 may perform a big data analysis to calculate a basis for managing objects using the Breeds Analysis 262, Fodders Analysis 264, Environment Analysis 266, and/or Regions Analysis 268. In one example, the optimal basis may be a predetermined amount of fodders for feeding objects. For example, the Breeds Analysis 262 may include an analysis of qualities of objects having different breeds. The Fodders Analysis 264 may include an analysis of qualities of objects fed with different fodders. The Environment Analysis 266 may include an analysis of qualities of objects fed in different environments. The Regions Analysis 268 may include an analysis of qualities of objects fed within different regions.

The System Maintenance Service 208 may include one or more modules to perform maintenance for systems 112 (e.g., system 112a and system 112b). As shown in FIG. 2, in some embodiments, the System Maintenance Service 208 may include a Data Backup Module 234, a Data Recovery Module 236, a System Recording Module 238, and a Message Recording Module 240. The Data Backup Module 234 can backup data relating to objects. The Data Recovery Module 236 can recovery data relating to objects. The System Recording Module 238 can record data relating to a use of the systems 112. The Message Recording Module 240 can record messages sent by the systems 112 to users.

In some embodiments, information (e.g., parameters and data) as described above with reference to FIG. 2 may be stored in database 104.

FIG. 3 illustrates a block diagram of an exemplary data collection gateway, according to example implementations of the present disclosure. As shown, in some embodiments, the data collection gateway 114 may include a main thread 300. The main thread 300 may create child threads such as a processing thread 302, a real-time data transmitting thread 304, a historical data transmitting thread 306, and a daemon thread 308.

As shown in FIG. 3, in some embodiments, the processing thread 302 may receive parameters relating to objects and/or commands from server 102 and transmit the received parameters and/or commands to the apparatus 116. In some embodiments, the processing thread 302 may store the received parameters in a configuration file 310. The real-time data transmitting thread 304 may receive data collected by the apparatus 116 and transmit the received data to server 102.

In some embodiments, the connection between the apparatus 116 and server 102 may be interrupted. In these examples, the real-time data transmitting thread 304 may store the received data in a temporary data file 312. Also, the historical data transmitting thread 306 may dynamically monitor the connection and may transmit the data stored in the temporary data file 312 to server 102 once the connection is recovered. In some embodiments, the daemon thread 308 may monitor the operation of the data collection gateway 114. For example, the daemon thread 308 may restart the data collection gateway 114 if there is no parameters, commands, and/or data transmitted for a predetermined period of time. In some embodiments, users of the infrastructure 100 may set the predetermined period of time or a specified time interval for restarting the data collection gateway 114.

FIGS. 4A and 4B each illustrates a block diagram of an exemplary farm, according to example implementations of the present disclosure. As shown in FIG. 4A, in some embodiments, the farm 110 may include a feeding area 402 and a rest area 404. The feeding area 402 may include a low-weight area 406, a medium-weight area 408, and a high-weight area 410. The low-weight area 406, the medium-weight area 408, and the high-weight area 410 are connected to the apparatus 116, respectively. In these examples, the apparatus 116 may sort objects to the low-weight area 406, the medium-weight area 408, or the high-weight area 410 based on the adjusted threshold weight and the collected weights that are described above. In some embodiments, the feeding area 402 may include a quarantine area 412. Weak or sick objects may be fed in the quarantine area 412. In some embodiments, the quarantine area 412 may be connected to the apparatus 116 directly. The apparatus 116 may sort weak or sick objects to the quarantine area 412. In some embodiments, the farm 110 may include a one-way gate 418. The objects in the feeding area 402 may pass through the one-way gate 418 to the rest area 404.

In some embodiments, as shown in FIG. 4A, the feeding area 402 may include one or more dry fodders 414. The rest area 404 may include one or more watering tanks 416. In these examples, objects can eat dry fodders in the feeding area 402 and drink water in the rest area 404. The farm as shown in FIG. 4B is similar to the farm as shown in FIG. 4A. One difference is that in FIG. 4B, the feeding area 402 may include one or more dry-wet fodders 420. In these examples, objects have dry fodders together with water.

FIGS. 5A and 5B each illustrates an exemplary apparatus and/or its components, according to example implementations of the present disclosure. As shown in FIG. 5A, in some embodiments, the apparatus 116 includes an entry gate 502, a sorting scale 504 coupled to the entry gate 502, and an exit gate 506 coupled to the sorting scale 504. The apparatus 116 also includes a sorting gate 508 and a plurality of gates 510 (e.g., gates 510a, 510b, and 510c) coupled to the sorting gate 508. Objects may be sorted to three different areas through the three gates 510a, 510b, and 510c. The apparatus further includes a controller 512 to control the operation of the apparatus 116.

FIG. 5B illustrates the controller 512, according to example implementations of the present disclosure. As shown in FIG. 5B, in some embodiments, the controller 512 may include one or more modules such as an entry gate controlling module 522, a data collecting module 524, a sorting gate controlling module 526, and an exit gate controlling module 528. The controller 512 may also include other modules not shown in FIG. 5B. Functions of the modules may be performed by a processor such a Central Processing Unit (CPU), as described with reference to FIG. 9 below.

The entry gate controlling module 522 may control the status of the entry gate 502. In some embodiments, the entry gate controlling module 522 is configured to open the entry gate 502 to enable an object such as a livestock to enter the sorting scale 504 through the entry gate 502. In order to collect precise data relating to the object through sensors, the apparatus 116 needs to ensure that the entry gate 502 works properly. For example, the entry gate controlling module 522 may detect the status of the entry gate 502 to determine whether the entry gate 502 is closed. After the object enters the sorting scale 504 through the entry gate 502, the entry gate 502 should be closed properly. Thus, another object cannot enter the sorting scale 504 through the entry gate 502 and interfere collecting data of the object in the sorting scale 504. In some embodiments, the entry gate controlling module 522 is configured to close the entry gate 502 for a number of times. Upon determining that the number of times has a threshold value (e.g., 5 times), the entry gate controlling module 522 is configured to generate a warning signal indicating that the entry gate 502 is not closed. The warning signal can notify a user of the apparatus 116 that the entry gate 502 may not work properly, e.g., due to the malfunction of the entry gate 502.

The data collecting module 524 may collect data relating to the object after the object enters the sorting scale 504 through the entry gate 502. In some embodiments, the data collecting module 524 is configured to obtain a weight of the object using the sorting scale 504. The sorting scale 504 may include one or more sensors to measure weights of objects. In some embodiments, the data collecting module 524 is configured to obtain weights of a plurality of objects using the sorting scale 504 and upload the weights to a server (e.g., server 102) for storing the weights in a database (e.g., database 104). As described above, by uploading data collected through sensors to server, the system in the farm can share its collected data through server to others such as other farms, meat packers, or their customers.

The sorting gate controlling module 526 may control the status of the sorting gate 508 using the data collected by the data collecting module 524. In some embodiments, the sorting gate controlling module 526 is configured to move the sorting gate 508 based on the weight of the object to form a passageway between the exit gate 506 and one of the plurality of gates 510 (e.g., gate 510a). The object can move to different designated areas (e.g., low-weight area 406, medium-weight area 408, high-weight area 410, or quarantine area 412) through the passageway.

To form the passageway, in some embodiments, the sorting gate controlling module 526 is configured to determine a threshold weight based on parameters relating to the plurality of objects obtained from server 102, and perform a comparison between the weight of the object and the threshold weight. The parameters may include a reference threshold weight as described above. In some embodiments, the sorting gate controlling module 526 is configured to move the sorting gate 508 based on the comparison to form the passageway. For example, if the weight of the object (e.g., 105 kilograms) is greater than the threshold weight (e.g., 100 kilograms), which may indicate that the object meets a specific market requirement or feeding requirement and can be sold on the market. The sorting gate controlling module 526 may move the sorting gate 508 to form a passageway between the exit gate 506 and the gate 510a. Thus, the object can move to a designated area (e.g., high-weight area 410) through the passageway between the exit gate 506 and the gate 510a.

In some embodiments, the apparatus 116 may include a corral 514 as shown in FIG. 5A. The corral 514 may be connected between the exit gate 506 and the plurality of gates 510. In these examples, the passageway can be formed within the corral 514.

The exit gate controlling module 528 may control the status of the exit gate to allow the object to move to different designated areas (e.g., high-weight area 410). In some embodiments, after moving the sorting gate 508, the exit gate controlling module 528 is configured to open the exit gate 506 to enable the object to pass through the passageway and reach the one of the plurality of gates 510. In conventional solutions, the exit gate 506 may be opened before moving the sorting gate 508. In these conventional solutions, however, the object may pass through the exit gate 506 before the passageway between the exit gate 506 and one of the plurality of gates 510 is formed. In this situation, when the sorting gate 508 moves to form the passageway, the moving sorting gate 508 may hit the object and the object may get injured. Opening the exit gate 506 after moving the sorting gate 508 as described in the present disclosure can avoid the accidental injury to the object. This is because, when the object passes through the exit gate 506, the sorting gate 508 has been moved to form the passageway. Thus, the object may simply pass through the already formed passageway and may not be hit by the sorting gate 508.

The controller 512 may also control the operation of the apparatus 116 to help the object to move to different designated areas (e.g., high-weight area 410). In some embodiments, the sorting gate controlling module 526 is configured to determine that the object is within the sorting scale 504 for a predetermined period of time. The sorting gate controlling module 526 can notify the exit gate controlling module 528. In response, the exit gate controlling module 528 is configured to utilize a mechanism or generate a signal to stimulate the object to pass through the exit gate 506. For example, the exit gate controlling module 528 may vibrate the exit gate 506 or generate a pungent odour to stimulate the object to pass through the exit gate 506.

In other embodiments, the sorting gate controlling module 526 is configured to determine that the object is within the sorting scale 504 for a predetermined period of time. The sorting gate controlling module 526 can notify the entry gate controlling module 522. In response, the entry gate controlling module 522 is configured to open the entry gate 502 while the exit gate 506 is open to facilitate the object to pass through the exit gate 506 by enabling another object to enter the sorting scale through the entry gate 502. For example, the object may be a first pig within the sorting scale 504 for a predetermined period of time such as 5 minutes. The entry gate controlling module 522 can open the entry gate 502 such that a second pig can enter the sorting scale 504 through the opened entry gate 502. Due to the limited space of the sorting scale 504, the second pig may push or kick the first pig to expel the first pig to pass through the opened exit gate 506 to different designated areas (e.g., high-weight area 410).

When passing through the passageway, the object may stay in the passageway, which may significantly affect the efficiency of sorting the objects to designated areas. In some embodiments, the sorting gate controlling module 526 is configured to swing the sorting gate 508 to facilitate the object to pass through the passageway and reach the one of the plurality of gates 510.

In some embodiments, the gates 510 are one-way gates. The object may pass through one of the one-way gates (e.g., gate 510a) from the passageway. By using one-way gates, after the object has passed through a one-way gate (e.g., gate 510a), the object can be prohibited from returning back to the passageway. In other embodiments, the gates 510 may be two-way gates.

In some embodiments, the object may have a unique identifier such as a Radio Frequency Identification (RFID) card attached to the object. The apparatus 116 may include a signal receiver 516 as shown in FIG. 5A to retrieve information stored in the unique identifier. The signal receiver 516 may transmit the retrieved information to a memory of the controller 512 or the apparatus 116 for storing.

In some embodiments, the apparatus 116 may include a cylinder 518 connected to the sorting gate 508 as shown in FIG. 5A. The sorting gate controlling module 526 can swing the sorting gate 508 through the cylinder 518.

In some embodiments, the apparatus 116 may include a cylinder electromagnetic valve 520 as shown in FIG. 5A. The sorting gate controlling module 526 may control the status of the sorting gate 508 through the cylinder electromagnetic valve 520. Specifically, the cylinder electromagnetic valve 520 can control the cylinder 518 connected to the sorting gate 508, which may cause the sorting gate 508 to swing. Similarly, the entry gate controlling module 522 and the exit gate controlling module 528 may control the status of the entry gate 502 and the exit gate 506 through the cylinder electromagnetic valve 520, respectively.

FIG. 5C illustrates another exemplary apparatus 116, according to example implementations of the present disclosure. Comparing to the apparatus 116 shown in FIG. 5A, the apparatus 116 shown in FIG. 5C, includes two one-way gates (i.e., gates 510d and 510e) instead of three. Thus, objects may be sorted to two different areas through the two gates 510d and 510e. The apparatus 116 shown in FIG. 5C also includes an axis 530 connected to the sorting gate 508 and the gates 510. The apparatus 116 may swing the sorting gate 508 through the axis 530.

FIG. 5D illustrates a three-dimensional structure of the apparatus 116, according to example implementations of the present disclosure. As shown, in some embodiments, the apparatus 116 may include a casing 532 connected to the top of the sorting gate 508. The casing 532 can protect the sorting gate 508. For example, the casing 532 can prevent the sorting gate 508 from rusting.

FIG. 5E illustrates an external frame structure of the sorting scale 504, according to example implementations of the present disclosure. As shown, in some embodiments, the sorting scale 504 may include a main frame 534 and a plurality of panels 536. In some embodiments, the sorting gate 508 may include a sensor-supporting component 538 connected to the controller 512. The sensor-supporting component 538 may support or hold sensors. In some embodiments, the sorting gate 508 may include a connecting component 540. The connecting component 540 may connect the external frame structure of the sorting scale 504 with an internal frame structure of the sorting scale 504, which will be illustrated below.

FIG. 5F illustrates an internal frame structure of the sorting scale 504, according to example implementations of the present disclosure. As shown, in some embodiments, the sorting scale 504 may include the entry gate 502, exit gate 506, cylinder 518, and cylinder electromagnetic valve 520 as described above. In some embodiments, the sorting scale 504 may also include a gate frame 542 and a channel frame 544. The gate frame 542 and the channel frame 544 may form a channel 546 for objects to pass through the sorting gate 508.

As shown in FIG. 5F, in some embodiments, the sorting scale 504 may include a proximity switch 548. The proximity switch 548 may detect the status of the entry gate 502 and send the result to the entry gate controlling module 522 for controlling the entry gate 502. For example, when proximity switch 548 detects that the entry gate 502 is not closed, it sends the result to the entry gate controlling module 522. The entry gate controlling module 522 may close the entry gate 502 for a number of times or generate a warning signal indicating that the entry gate 502 is not closed properly as described above.

As shown in FIG. 5F, in some embodiments, the sorting scale 504 may include a preventing device 550, which may prevent objects from lying down. The preventing device 550 may generate a signal or utilize a mechanism to prevent objects from lying within the sorting scale 504. This may facilitate objects to pass through the sorting scale 504.

As shown in FIG. 5F, in some embodiments, the sorting scale 504 may include a marking device 552. The marking device 552 may leave a mark on an object when the object is detected abnormal. For example, when sensors, such as certain medical sensors, detect a potential viral infection of an object, the marking device 552 may leave a mark on the object. In some embodiments, the marking device 552 can be an inkjet device.

As shown in FIG. 5F, in some embodiments, the sorting scale 504 may include a connecting rod 554. The external frame structure of the sorting scale 504 and the internal frame structure of the sorting scale 504 can be connected together through the connecting rod 554.

FIG. 6 is a flowchart illustrating various operations in a method 600 of sorting objects, according to example implementations of the present disclosure. The method 600 may be performed by the apparatus 116, which is described above with reference to FIGS. 5A-5F. In some implementations, as shown in FIG. 6, at block 602, the apparatus 116 may be initialized. For example, the apparatus 116 may receive a reference threshold weight from server 102 for initialization. At block 604, the apparatus 116 can close the exit gate 506 and open the entry gate 502 to allow an object to enter the sorting scale 504. The sorting scale 504 may collect a weight of the object through sensors. At block 606, the apparatus 116 can determine whether the collected weight of the object is higher than a predetermined weight. If not ("N"), the object may have not entered into the sorting scale 504. In this situation, the apparatus 116 can continue to monitor whether the collected weight of the object is higher than the predetermined weight. Upon determining that the weight of the object is higher than the predetermined weight (i.e., "Y" at block 606), which may indicate that the object have entered into the sorting scale 504, the method 600 can proceed to block 608.

At block 608, the apparatus 116 can close the entry gate 502. The apparatus 116 can wait for a predetermined time period, as shown at block 610. This is because entry gate controlling module 522 may need a time period to actually close the entry gate 502. For example, a user of the apparatus 116 may set the predetermined time period. At block 612, the apparatus 116 can determine whether the entry gate 502 is closed properly. If not, the apparatus 116 can close the entry gate 502 for a number of times to ensure that the entry gate 502 is closed. At block 614, the apparatus 116 can determine whether the number of times has a threshold value (e.g., 5 times). If not, the apparatus 116 can open the entry gate 502 and wait for a predetermined time period, as shown at block 616 and block 618, respectively. The method 600 can go back to block 608 from block 618. Repeating the method 600 from block 608 to block 618 may ensure that the entry gate 502 works properly. By doing so, the apparatus 116 may collect precise data relating to the object through sensors. Upon determining that the number of times has the threshold value, the apparatus 116 can generate a warning signal, as shown at block 620. The warning signal can notify the user that the entry gate 502 may not work properly, e.g., due to the malfunction of the entry gate 502. The process can proceed to block 622.

On the other hand, upon determining that the entry gate 502 is closed properly at block 612. The process can proceed to block 622 from block 612. At block 622, the apparatus 116 can collect and process data relating to the object such as the weight of the object. For example, the apparatus 116 can filter out glitch data and calculate an average value of the collected data. The apparatus 116 can store and upload the collected data to server 102 for sharing the collected data to others such as other farms, meat packers, or their customers, as shown at block 624. At block 626, the apparatus 116 can move the sorting gate 508 based on the weight of the object to form a passageway between the exit gate 506 and one of the plurality of gates 510. For example, the passageway can be formed between the exit gate 506 and gate 510a when the weight of the object is higher than the reference threshold weight, as shown at block 628. Similarly, the passageway can be formed between the exit gate 506 and gate 510b or gate 510c, as shown at block 630 and block 632, respectively.

After the passageway is formed, at block 634, the apparatus 116 can open the exit gate 506. As described above, opening the exit gate 506 after moving the sorting gate 508 can avoid the accidental injury to the object.

At block 636, the apparatus 116 can determine whether the weight of the object is lower than the predetermined weight. If so, the object may have left the sorting scale 504 and entered the passageway. In this situation, the apparatus 116 can close the exit gate 506, as shown at block 638. At block 640, the apparatus 116 can utilize a mechanism, such as swing the sorting gate 508, to facilitate the object to pass through the passageway and reach the one of the plurality of gates 510.

If the apparatus 116 determines that the weight of the object is not lower than the predetermined weight at block 636, this may indicate that the object is still within the sorting scale 504. In this situation, the apparatus may utilize a mechanism to facilitate the object to leave the sorting scale 504 and pass through the exit gate 506. For example, at block 644, the apparatus 116 can determine whether the exit gate 506 has opened for a predetermined period of time (e.g., 5 minutes). If not, the method 600 can proceed back to 636. Upon determining that the exit gate 506 has opened for the predetermined period of time, the apparatus 116 can open the entry gate 502 while the exit gate 506 is open, as shown at block 646. In this situation, another object can enter the sorting scale 504 through the opened entry gate 502. As described above, due to the limited space of the sorting scale 504, the other object may push or kick the object stayed in the sorting scale 504 to expel the object to leave the sorting scale 504 and pass through the opened exit gate 506.

The apparatus 116 can monitor whether the weight of the object is lower than the predetermined weight, as shown at block 648. Upon determining that the weight of the object is lower than the predetermined weight, which may indicate that the object has left the sorting scale 504 and entered the passageway, the apparatus 116 can close the exit gate 506, store information indicating the status of opening the entry gate 502 while opening the exit gate 506, as shown at block 650. The user may access the stored information.

The method 600 can proceed to block 642 from block 640 or block 650. At block 642, the apparatus 116 can clear the collected data such as the weight of the object to zero. The method 600 can proceed to block 604 to start sorting other objects similarly as described above.

FIG. 7 is a flowchart illustrating various operations in a method 700 of sorting objects, according to other example implementations of the present disclosure. As shown at block 702, the method 700 includes opening an entry gate 502 to enable an object to enter a sorting scale 504 through the entry gate 502. At block 704, the method 700 includes obtaining a weight of the object using the sorting scale 504. At block 706, the method 700 includes moving the sorting gate 508 based on the weight of the object to form a passageway between an exit gate 506 and one of the plurality of gates 510. Thereafter, at block 708, the method 700 includes opening the exit gate 506 to enable the object to pass through the passageway and reach the one of the plurality of gates 510. Based on the method 700, objects can be sorted to different areas in accordance with specific market requirements or feeding requirements.

FIG. 8 is a flowchart illustrating various operations in a method 800 of managing livestock, according to example implementations of the present disclosure. In order to help livestock efficiently pass through multiple gates (e.g., entry gate 502, exit gate 506, sorting gate 508, and/or gates 510) of the apparatus 116, training the livestock is required to ensure that the livestock is familiar with the apparatus 116. As shown at block 802, the method 800 may include training livestock. In some embodiments, at block 802, the multiple gates (e.g., entry gate 502, exit gate 506, sorting gate 508, and gates 510) of the apparatus 116 may be all opened by default to avoid accidental injury to the livestock.

At block 804, the method 800 may include setting parameters relating to livestock. In some embodiments, the parameters relating to livestock may be obtained from server 102 through the data collection gateway 114. In some embodiments, the parameters relating to livestock may be set by a user of the system 112.

At block 806, the method 800 may include sorting livestock in a feeding mode. Under the feeding mode, livestock may be sorted to different areas to have different fodders. For example, livestock sorted to the low-weight area 406 may have fodders with higher nutrition, and livestock sorted to the high-weight area 410 may have fodders with lower nutrition. Sorting livestock in the feeding mode can reduce the difference of weights among the livestock, and therefore can feed the livestock by phase to increase the profit for farms.

At block 808, the method 800 may include sorting livestock in a market mode. Under the market mode, livestock may be sorted to two areas such as a market area and a pending area. For example, livestock sorted to the market area can be sold on the market and those sorted to the pending area may continue being fed in the farm 110. Sorting livestock in the market mode can automatically sort qualified livestock for selling on the market, and therefore can significantly reduce labor cost.

FIG. 9 illustrates hardware components of the controller 512, according to example implementations of the present disclosure. As shown, in some embodiments, the controller 512 may include a CPU 902 for executing instructions stored in a memory 904.

As described above, in some embodiments, the controller 512 may include one or more modules such as an entry gate controlling module 522, a sorting gate controlling module 526, and an exit gate controlling module 528. In some embodiments, these modules may be connected to the CPU 902 and may control gates (e.g., the entry gate 502, the sorting scale 504, and the exit gate 506) through respective cylinder electromagnetic valve based on commands provided by the CPU 902. In some embodiments, the controller 512 may include a marking controlling module 916 connected to the CPU 902. For example, the entry gate controlling module 522 may control the status of the entry gate 502 through an entry gate cylinder electromagnetic valve 906. Similarly, the sorting gate controlling module 526 and the exit gate controlling module 528 may control the status of the sorting gate 508 and exit gate 506 through a sorting gate cylinder electromagnetic valve 908 and an exit gate cylinder electromagnetic valve 910, respectively.

As shown in FIG. 9, in some embodiments, the controller 512 may include a data collecting module 524 connected to the CPU 902. In some embodiments, the data collecting module 524 may collect data measured by a weight sensor 912 and transmit the data to the CPU 902 for processing.

As described above, the apparatus 116 may include a signal receiver 516 to retrieve information from a unique identifier such as a RFID of the object. As shown in FIG. 9, in some embodiments, the controller 512 may include an ID detecting module 914 connected to the CPU 902. The ID detecting module 914 may detect RFID of the object in the retrieved information from the signal receiver 516 and transmit the retrieved information to the memory 904 of the controller 512 for storing.

As shown in FIG. 9, in some embodiments, the controller 512 may include a marking controlling module 916 connected to the CPU 902. The marking controlling module 916 may control the status of the marking device 552 through a marking device cylinder electromagnetic valve 918. For example, when sensors detect a potential viral infection of an object, the marking controlling module 916 may control the marking device 552 to leave a mark on the object.

As described above, the proximity switch 548 may detect the status of the entry gate 502 and send the result to the entry gate controlling module 522 for controlling the entry gate 502. In some embodiments, the proximity switch 548 may send the result to the CPU 902, which may send commands based on the result to the entry gate controlling module 522 for controlling the entry gate 502.

As shown in FIG. 9, in some embodiments, the controller 512 may include a CAN transceiver module 920 connected to the CPU 902. The CAN transceiver module 920 may receive parameters relating to objects from server 102 and upload the data collected through sensors to server 102.

As shown in FIG. 9, in some embodiments, the controller 512 may include a power supply circuit module 922 connected to the CPU 902. The power supply circuit module 922 may provide an output voltage 924 for the system. In some embodiments, the controller 512 may include a display processing module 926 connected to the CPU 902. The display processing module 926 may control a display 928 to display data collected through sensors. In some embodiments, the controller 512 may include an Input/Output processing module 930 connected to the CPU 902. The Input/Output processing module 930 may connect to a keyboard 932 to allow users of the system 112 to input information.

Certain implementations may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions. The machine-readable medium may be referred to as a non-transitory machine-readable medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "first," "second," "third," "fourth," etc., as used herein are meant as labels to distinguish among different elements and may not necessarily have an ordinal meaning according to their numerical designation. Therefore, the terminology used herein is for the purpose of describing particular implementations only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112(f), for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus, comprising:
   an entry gate;
   a sorting scale coupled to the entry gate;
   an exit gate coupled to the sorting scale;
   a sorting gate, wherein the sorting gate includes two substantially parallel components;
   a plurality of gates coupled to the sorting gate; and a processor and a memory storing executable instructions that, in response to execution by the processor, cause the apparatus to:
   open the entry gate to enable a first object to enter the sorting scale through the entry gate;
   obtain a first weight of the first object using the sorting scale;
   close the entry gate upon determining the first weight of the first object is higher than a predetermined weight;
   move the two substantially parallel components of the sorting gate based on the first weight of the first object to form a passageway between the exit gate and one of the plurality of gates, wherein the two substantially parallel components of the sorting gate are substantially parallel before and after the moving; thereafter,
   open the exit gate to enable the first object to pass through the passageway and reach the one of the plurality of gates;
   obtain a second weight of the first object using the sorting scale;
   close the exit gate upon determining the second weight of the first object is lower than the predetermined weight;
   determine that the exit gate has been opened for a predetermined period of time; and in response,
   open the entry gate while the exit gate is open to enable a second object to enter the sorting scale through the entry gate to facilitate the first object to pass through the exit gate.

2. The apparatus of claim 1, wherein the apparatus being caused to move the two substantially parallel components of the sorting gate based on the first weight of the first object includes being caused to:
   determine a threshold weight based on parameters relating to a plurality of objects obtained from a server;
   perform a comparison between the first weight of the first object and the threshold weight; and
   move the two substantially parallel components of the sorting gate based on the comparison to form the passageway.

3. The apparatus of claim 2, wherein the memory stores further executable instructions that, in response to execution by the processor, cause the apparatus to further:
   obtain weights of the plurality of objects using the sorting scale; and
   upload the weights to the server for storing the weights in a database.

4. The apparatus of claim 1, wherein the memory stores further executable instructions that, in response to execution by the processor, cause the apparatus to further:
   attempt to close the entry gate for a number of times; and
   upon determining that the number of times has a threshold value, generate a warning signal indicating that the entry gate is not closed.

5. The apparatus of claim 1, wherein the memory stores further executable instructions that, in response to execution by the processor, cause the apparatus to further:
   determine that the first object is within the sorting scale for a predetermined period of time; and in response,
   utilize a mechanism or generate a signal to stimulate the first object to pass through the exit gate.

6. The apparatus of claim 1, wherein the memory stores further executable instructions that, in response to execution by the processor, cause the apparatus to further:
   obtain a third weight of the first object using the sorting scale while both the entry gate and the exit gate are open; and
   close the exit gate upon determining the third weight of the first object is lower than the predetermined weight.

7. The apparatus of claim 1, wherein the memory stores further executable instructions that, in response to execution by the processor, cause the apparatus to further:
   shake the sorting gate to facilitate the first object to pass through the passageway and reach the one of the plurality of gates.

8. A method implemented by an apparatus, the apparatus comprising an entry gate, a sorting scale, a sorting gate including two substantially parallel components, an exit gate, and a plurality of gates, and the method comprising:
   opening the entry gate to enable a first object to enter the sorting scale through the entry gate;
   obtaining a first weight of the first object using the sorting scale;
   closing the entry gate upon determining the first weight of the first object is higher than a predetermined weight;
   moving the two substantially parallel components of the sorting gate based on the first weight of the first object to form a passageway between the exit gate and one of the plurality of gates, wherein the two substantially parallel components of the sorting gate are substantially parallel before and after the moving; thereafter,
   opening the exit gate to enable the first object to pass through the passageway and reach the one of the plurality of gates;
   obtaining a second weight of the first object using the sorting scale;
   closing the exit gate upon determining the second weight of the first object is lower than the predetermined weight
   determining that the exit gate has been opened for a predetermined period of time; and in response,
   opening the entry gate while the exit gate is open to enable a second object to enter the sorting scale through the entry gate to facilitate the first object to pass through the exit gate.

9. The method of claim 8, wherein moving the two substantially parallel components of the sorting gate based on the first weight of the first object includes:
   determining a threshold weight based on parameters relating to a plurality of objects obtained from a server;
   performing a comparison between the first weight of the first object and the threshold weight; and
   moving the two substantially parallel components of the sorting gate based on the comparison to form the passageway.

10. The method of claim 8, further comprising:
    attempting to close the entry gate for a number of times; and
    upon determining that the number of times has a threshold value, generating a warning signal indicating that the entry gate is not closed.

11. The method of claim 8, further comprising:
    determining that the first object is within the sorting scale for a predetermined period of time; and in response,
    utilizing a mechanism or generating a signal to stimulate the first object to pass through the exit gate.

12. The method of claim 8, further comprising:
    obtaining a third weight of the first object using the sorting scale while both the entry gate and the exit gate are open; and closing the exit gate upon determining the third weight of the first object is lower than the predetermined weight.

13. The method of claim 8, further comprising:

shaking the sorting gate to facilitate the first object to pass through the passageway and reach the one of the plurality of gates.

* * * * *